US005360707A

United States Patent [19]

Kato et al.

[11] Patent Number: 5,360,707

[45] Date of Patent: Nov. 1, 1994

[54] PHOTOGRAPHIC PRINTING PAPER SUPPORT

[75] Inventors: Atsushi Kato; Sei Kawahara; Yasuo Iwasaki, all of Fujinomiya, Japan

[73] Assignee: Fuji Photo Film Co., Ltd., Kanagawa, Japan

[21] Appl. No.: 169,633

[22] Filed: Dec. 20, 1993

[30] Foreign Application Priority Data

Dec. 18, 1992 [JP] Japan .................................. 4-356136

[51] Int. Cl.[5] ............................ G03C 1/78; B32B 5/16

[52] U.S. Cl. .................................... 430/538; 430/532; 430/537; 428/328; 428/330; 428/332; 428/511

[58] Field of Search ........................ 430/532, 537, 538; 428/328, 330, 332, 511, 516

[56] References Cited

U.S. PATENT DOCUMENTS

| | | | |
|---|---|---|---|
| 4,220,471 | 9/1980 | Data et al. | 430/538 |
| 4,675,295 | 6/1987 | von Meer et al. | 430/538 |
| 4,705,746 | 11/1987 | Tamagawa et al. | 430/538 |
| 4,858,773 | 1/1990 | Dethlefs et al. | 430/538 |
| 5,156,707 | 10/1992 | Kato et al. | 162/137 |

FOREIGN PATENT DOCUMENTS

| | | | |
|---|---|---|---|
| 62-6256 | 1/1987 | Japan | G03C 1/87 |
| 328696 | 4/1991 | Japan | G03C 1/76 |

*Primary Examiner*—Jack P. Brammer
*Attorney, Agent, or Firm*—Sughrue, Mion, Zinn, Macpeak & Seas

[57] ABSTRACT

Disclosed is a photographic printing paper support comprising a waterproof substrate constituted of raw paper and polyolefin resin coats covering the both surfaces thereof, which further has on the back side of the substrate a backing layer containing at least (a) colloidal silica, (b) an aqueous dispersion of a styrene-acrylate copolymer prepared by the polymerization in the presence of a water-soluble high-molecular compound, (c) at least one substance selected from a group consisting of carboxyl or sulfo group-containing water-soluble high-molecular compounds, the metal salts thereof and hydrophilic organic high-molecular colloidal substances and (d) an aqueous dispersion of a polyolefin resin having a melting point below 100°C.

19 Claims, No Drawings

PHOTOGRAPHIC PRINTING PAPER SUPPORT

FIELD OF THE INVENTION present invention relates to a photographic printing paper support which has an excellent water-resisting property and, in particular, to a support for photographic printing paper which ensures improved ink-printability on the back side thereof and satisfactory spliceability in the splicing operation utilizing ultrasonic waves or thermal fusion.

BACKGROUND OF THE INVENTION

In general, raw paper has so far been used as a substrate for photographic printing paper. For the purpose of imparting a water-resisting property to raw paper, both sides thereof are generally covered with polyolefin resins, such as polyethylene. The photographic printing paper support using a polyolefin-covered raw paper as described above is coated with photographic emulsions on one side thereof. This side of the support is called "front side". The other side of the support on which any photographic emulsions are not coated is called "back side".

In case of a roll-form silver halide photographic material, letters and/or marks have often been typewritten on a backing layer provided on the back side thereof in order to clearly indicate the boundary between neighbouring image planes in anticipation of the photographic material's being automatically cut into image planes or in order to write image information on each image plane.

Therein, the typewriting has caused a trouble such that the typed ink was eluted into a processing bath, the color thereof faded to such an extent as not to fully perform its function, or it partly transferred onto the emulsion layer side when the photographic material was wound up into a roll.

Under these circumstances, some proposals have been made with the intention of imparting satisfactory penciling and typewriting qualities to photographic printing paper. For instance, (i) the photographic printing paper support comprising a polyolefin-covered waterproof substrate having on the back side thereof a written letter-retaining layer constituted of a styrene-acrylate copolymer containing binder and an inorganic pigment (e.g., crystalline silica, colloidal silica) dispersed therein and (ii) the silver halide photographic material containing a carboxyl or sulfo group-containing compound in a backing layer thereof mainly for improvement in antistatic property have been proposed [in JP-A-62-6256 (the term "JP-A" as used herein means an "unexamined published Japanese patent application") and JP-B-03-28696 (the term "JP-B" as used herein means an "examined Japanese patent publication), respectively]. However, those materials can be still improved upon typewriting quality.

Meanwhile, photographic printing paper is manufactured by applying various photographic layers to a support generally measuring 1 to 2 meters in width, cut into sheets or rolls with a long length depending on the end-use purpose thereof, and then marketed.

In supplying roll-form printing papers with a long length, cut pieces of printing paper are overlapped with an appropriate width when they have a length less than the desired roll length, and the overlapped part thereof is thermally fused by a splicing method using ultrasonic waves or so on to splice the cut pieces.

In case of broad photographic printing paper, however, the thermal fusion method, whether it uses ultrasonic wave irradiation or heat application, has a drawback such that it cannot ensure a satisfactorily spliced state to the overlapped part thereof because photographic layers including emulsion layers and coatings on the back side are present between two polyolefin resin-covered supports to adhere to each other.

As a result of our intensive studies for solving the above-described problems, it has been found out that not only an improved typewriting quality but also enhanced spliceability upon thermal fusion utilizing ultrasonic waves or so on can be obtained by forming a backing layer on the back side of a waterproof support comprising raw paper covered with polyolefin resins on beth sides thereof and further by using in said backing layer an aqueous dispersion of polyolefin resin having a melting point below 100° C., thus achieving the present invention.

SUMMARY OF THE INVENTION

Therefore, an object of the present invention is to provide a photographic printing paper support which has not only good typewriting qualities but also high spliceability.

The above-described object of the present invention is attained with a photographic printing paper support comprising a waterproof substrate constituted of raw paper and polyolefin resin coats covering the both surfaces thereof, said substrate further having on the back side a backing layer containing at least (a) colloidal silica, (b) an aqueous dispersion of a styrene-acrylate copolymer prepared by the polymerization in the presence of a water-soluble high-molecular compound, (c) at least one substance selected from among carboxyl or sulfo group-containing water-soluble high-molecular compounds, the metal salts thereof and hydrophilic organic high-molecular colloidal substances, and (d) an aqueous dispersion of a polyolefin resin having a melting point below 100° C.

DETAILED DESCRIPTION OF THE INVENTION

Colloidal silica used as the component (a) in the present invention is a colloidal solution in which superfine grains of silicon dioxide is dispersed using water as a main dispersing medium. Therein, it is desirable that the average size of the grains be in the range of 5 to 50 $\mu$m. This is because the colloidal silica is too ready to gel when it has an excessively fine grain size, while it tends to sediment when the grain size thereof is too large. The coverage of the colloidal silica ranges from 0.04 to 1.0 $g/m^2$, preferably from 0.06 to 0.5 $g/m^2$, on a solids basis. When the colloidal silica has a too small coverage the antistatic property yielded thereby is insufficient, while it cannot provide the strength necessary for coating formation and the desired printability when the coverage thereof is too great.

Examples of colloidal silica as described above include various kinds of silica sol suspensions on the market, such as Rudox HS, Rudox AS and the like (products of E. I. Du Pont de Nemours & Co. Inc. ), Snowtex 20, Snowtex 30 and Snowtex C (products of Nissan Chemicals Industries, Ltd. ), and so on.

In addition to the above-described colloidal silica, the present invention uses an aqueous dispersion of a styrene-acrylate copolymer as the component (b), which functions as a binder.

The coverage of the component (b) ranges from 0.05 to 2.0 $g/m^2$, preferably from 0.1 to 1.0 $g/m^2$, on a solids basis.

In the foregoing copolymer, it is desirable that the styrene/acrylate ratio ranges from 90/10 to 10/90 by mole. Since the copolymer having a styrene fraction greater than 90 mole % is too high in glass transition temperature, it cannot form a satisfactory film under ordinary drying condition. The unsatisfactory film formation is apt to result in weak adhesion to the polyolefin layer. On the other hand, the copolymer having a styrene fraction less than 10 mole % has a too low glass transition temperature. Therefore, the resulting backing layer tends to cause adhesion troubles such that it adheres to the raw paper surface when wound up in the production process of polyolefin-covered paper and to the emulsion layer when wound up after the emulsion application.

Examples of an acrylate which can be used include esters of acrylic acid and aliphatic alcohols containing 1 to 8 carbon atoms, such as methyl acrylate, ethyl acrylate, isopropyl acrylate, butyl acrylate, hydroxypropyl acrylate, 2-hydroxyethyl acrylate, 2-ethylhexyl acrylate and the like.

For the purposes of heightening the adhesiveness of the foregoing copolymer to polyolefins, enhancing the stability of the coating composition for the backing layer as well as the stability of the copolymer dispersion and improving waterproof, chemical proof and heat-resisting properties of the backing layer, the copolymer may contain as additional constituent monomer(s) a cross-linking divinyl compound, such as ethylene glycol diacrylate, polyethylene glycol diacrylate, ethylene glycol dimethacrylate, polyethylene glycol dimethacrylate, divinylbenzene, etc.; a nitrogen-containing monomer, such as N-methylol acrylamide, acrylamide, diacetone acrylamide, etc.; a carboxyl group-containing monomer, such as acrylic acid, methacrylic acid, itaconic acid, crotonic acid, sorbic acid, cinnamic acid, citraconic acid, mesaconic acid, maleic acid, fumaric acid, ethacrylic acid, maleic anhydride, itaconic anhydride, etc.; or/and a glycidyl group-containing monomer such as glycidyl methacrylate or the like, or a hydroxyl group-containing monomer such as hydroxyethyl methacrylate, hydroxypropyl acrylate or the like.

The copolymer used in the present invention is prepared by polymerizing constituent monomers as described above in the presence of a water-soluble high-molecular compound. The water-soluble high-molecular compound used herein can be properly chosen from known ones, provided that they don't have any polymerizable unsaturated bonds. Specific examples of such a water-soluble high-molecular compound include a styrene-maleic acid copolymer, polyvinyl alcohol, polyvinylpyrrolidone, carboxymethyl cellulose, gelatin and so on. Of these compounds, a styrene-maleic acid copolymer (including modified ones) is preferred over others.

Styrene and an acrylate are copolymerized in a water medium in which a water-soluble high-molecular compound as cited above is dissolved. As a result of it, the copolymer can be obtained in the form of fine-particle dispersion. In the copolymerization, it is desirable that the concentration of a water-soluble high-molecular compound in the water medium be in the range of 5 to 50%, particularly 10 to 30%.

Further, it is desirable that the styrene-acrylate copolymer have a concentration ranging from 20 to 70% in an emulsified state.

The aqueous dispersion of the copolymer can optionally contain a lubricant, an emulsifier, an antioxidant, an aging inhibitor, a stabilizer, a hardener, an antistatic agent, and so on.

The component (c) of the backing layer is added in order to prevent the adhesion of foul substances to the back side of photographic printing paper, namely, as an antistatic agent. The coverage of the component (c) ranges from 0.01 to 1.0 $g/m^2$, preferably from 0.02 to 0.2 $g/m^2$, on a solids basis.

The present invention uses as the component (c) at least one compound selected from among carboxyl or sulfo group-containing water-soluble high-molecular compounds and/or the metal salts thereof, and hydrophilic organic high-molecular colloidal substances and/or the salts thereof.

As for the carboxyl group-containing water-soluble high molecular compounds, those preferred in the present invention are copolymers of maleic anhydride and unsaturated copolymerizable monomers containing at least 4 carbon atoms, such as ethylene series unsaturated monomers including $\alpha$-olefins containing at least 4 carbon atoms, alkyl vinyl ethers, styrenes and so on. These high-molecular compounds can be converted to salts by undergoing hydrolysis in the presence of an alkali such as sodium hydroxide, potassium hydroxide or the like, if desired.

The copolymers of maleic anhydride and unsaturated copolymerizable monomers containing at least 4 carbon atoms desirably have a molecular weight of from 2,000 to 150,000. Specifically, such a copolymer can be a reaction product obtained by hydrolyzing the copolymer of maleic anhydride and a copolymerizable monomer such as isobutylene, 1-pentene, butyl vinyl ether or styrene in the presence of an alkali such as sodium hydroxide, potassium hydroxide or the like. In the hydrolysis, the copolymer solution is adjusted to pH 5.0–9.0. In addition to the copolymers described above, the carboxyl group-containing water-soluble high molecular compounds can include a copolymer of styrene and itaconic or crotonic acid, a copolymer of methylacrylate and citraconic acid, the salts of these copolymers, and so on.

As for the sulfo group-containing water-soluble high-molecular compounds, those having a molecular weight of from 5,000 to 1,000,000 are preferred. Specific examples of such compounds include polystyrenesulfonic acid, polyvinylbenzylsulfonic acid, sodium salts thereof, potassium salts thereof, and the like.

As for the hydrophilic organic high-molecular colloidal substances, the aqueous solution or dispersion of a carboxyl-modified polyethylene or the alkali metal, ammonium, amine or like salt thereof can be used to particular advantage.

The polyolefin resin having a melting point below 100° C. which is used as the component (d) of the backing layer can be properly chosen from known polyolefin resins whose melting points are below 100° C. Specific examples of such resins include an ethylene-acrylic acid copolymer resin, an ethylene-maleic acid copolymer resin, an ethylene-acrylate copolymer resin, and resins obtained by modifying polyolefin resins, such as polyethylene, polypropylene, etc., with a hydroxyl group, a carboxyl group, an amino group, an antido group, an epoxy, an alkoxysilane group, or other functional groups including urethane, isocyanate and so on. Of these resins, an ethylene-acrylate copolymer resin is preferred in particular.

An aqueous dispersion of the polyolefin resin can be easily obtained in accordance with a known method using a surfactant and a water-soluble high-molecular compound. Therein, it is desirable that the particle size of the dispersed polyolefin resin range from 0.01 to 0.5 μm from the standpoints of mechanical strength of the backing layer and influence of the backing layer on the surface properties of the emulsion side in the form of rolled-up photographic printing paper.

When it is intended to prepare the fine-particle dispersion of the polyolefin resin, a method of polymerizing or copolymerizing constituent monomer(s) in an aqueous medium in which a water-soluble high-molecular compound is dissolved is used to advantage, similarly to the foregoing case of styrene-acrylate copolymers.

The coverage of the component (d) ranges from 0.01 to 1.0 g/m$^2$, preferably from 0.02 to 0.2 g/m$^2$, on a solids basis.

With respect to the blending ratio of the above-described components (a), (b), (c) and (d), it is desirable that the ratio (a)/(b)/(c)/(d) be in the range of (2–10)/(4–15)/(1–3)/(1–3) by weight.

From the standpoints of improving the hardness and scratching resistance of the the backing layer of the present invention, it is preferable that the backing layer further contain as a hardener a compound containing at least two ethyleneimino groups or glycidyl ether groups in a molecule. Specific examples of such a compound include those disclosed in JP-B-03-28696.

In incorporating such a hardener into the backing layer, it is desirable that the agent be dissolved in advance into an appropriate solvent, such as water, methanol, ethanol, N,N-dimethylformamide, acetone, ethyl acetate, etc.

Raw paper which can be used in the present invention has no particular limitation. More specifically, not only raw paper made mainly from natural pulp but also those made from mixtures of natural pulp with a synthetic fiber or pulp, in which the mixing ratio between them can be arbitrarily chosen, can be used depending on the end-use purpose.

As for the natural pulp, wood kraft pulp including softwood kraft pulp, hardwood kraft pulp and mixtures thereof are preferred. The wood kraft pulp may be prepared using any of cooking methods including polysulfide cooking, batch cooking and continuous cooking. In the preparation thereof, the cooking may be carried out till an appropriate hardening degree or a Kappa number is attained. Also, the wood kraft pulp may be prepared using the enzymatically pulping method disclosed in JP-B-59-38575.

Particularly preferred wood kraft pulp is obtained in the following manner: Wood chips are cooked with a suspension containing sodium hydroxide and sodium sulfide as chemical components in order to remove lignin therefrom, and in the presence of an anti-foaming agent or a foam inhibitor the resulting matter is separated into pulp fibers and the cooking residue (black liquor), followed by washing and bleaching treatments. The cooking liquor used may further contain a cooking assistant as a chemical component other than sodium hydroxide and sodium sulfite. Specific examples of a cooking assistant include salts such as sodium carbonate, sodium sulfate, slaked lime, calcium carbonate, etc., sodium borohydride, anthraquinone compounds and so on.

The natural kraft pulp may be used together with another natural pulp, if needed. The natural pulp used together to particular advantage is wood sulfide pulp including softwood sulfide pulp, hardwood sulfide pulp and mixtures thereof. Also, wood soda pulp and wood dissolution pulp can be used together with the natural kraft pulp.

The anti-foaming agent or the foam inhibitor used in the step of bleaching pulp can be properly chosen from known ones. More specifically, there can be used those containing as an effective component an ester compound of a higher fatty acid and an alcohol, mineral oil, liquid hydrocarbon oil or silicone oil, as disclosed, e.g., in JP-A-54-59404, JP-A-58-220896, JP-A-61-245391, JP-A-61-245319, U.S. Pat. No. 3,923,638 and U.S. Pat. No. 4,107,073.

Of those agents, water-base or oil-base compositions containing mineral oil or liquid hydrocarbon oil as a main component are particularly preferable in respect of the anti-foaming or foam-inhibiting power.

Anti-foaming agents or foam inhibitors as cited above may further contain ingredients such as hydrophobic silica, ethylenebis(higher alkylamide), silicone oil and so on. In order to make these anti-foaming agents or foam inhibitors be present in the step of washing unbleached kraft pulp, it is advantageous to add them to the slurry or thickener of the unbleached kraft pulp at any stage of the washing step.

Chlorine bleaching in the preparation of natural pulp is carried out using chlorine gas or chlorine water. Therein, chlorine dioxide may be used together. For the alkali treatment or extraction, sodium hydroxide is used to advantage, but calcium hydroxide, ammonia, a mixture thereof, and the like can also be used. For hypochlorite bleaching, it is preferable to use a bleaching powder prepared by causing chlorine gas to react with slaked lime, especially a hypochlorite bleaching powder prepared by blowing chlorine gas into milk of lime or a dilute sodium hydroxide solution (the so-called calcium-hypo bleaching solution or sodium-hypo bleaching solution) from an industrial point of view.

In the chlorine dioxide bleaching, chlorine dioxide prepared by a sulfite process, such as Mathieson process, New Mathieson process, Erust process, C.I.P. process, etc., or a hydrochloric acid process, such as a Kesting process, Nisso process, Sorvay process, etc., can be used to advantage. In the peroxide bleaching carried out under an alkaline condition, inorganic or organic peroxides, such as hydrogen peroxide, sodium peroxide, a peroxide bleaching solution (an aqueous solution containing a mixture of hydrogen peroxide, sodium hydroxide and sodium silicate, if necessary, to which magnesium sulfate is added), peracetic acid, 1-butylhydroperoxide, etc., and mixtures of two or more thereof can be favorably used. Suitable examples of an alkali used therein include hydroxides of alkali and alkaline earth metals, such as sodium hydroxide, potassium hydroxide, aqueous ammonia, magnesium hydroxide, calcium hydroxide, etc., and mixtures of two or more thereof.

The bleaching treatment can be carried out under a condition properly chosen from those described, e.g., in a book entitled "Pulp Shori oyobi Hyohaku" (which means "Pulp Processing and Bleaching"), compiled by Kami Pulp Gijutsu Kyokai, published in Jan. 27, 1968; and JP-B-58-43732.

Various additives can be incorporated in the substrate of the present invention in the step of preparing a paper stock slurry.

In particular, it is desirable to incorporate a proper combination of a sizing agent chosen from among metal salts of fatty acids and/or fatty acids, the alkylketene dimer emulsions or epoxidized higher fatty acid amides disclosed in JP-B-62-7534, alkenyl- or alkylsuccinic anhydride emulsions, rosin derivatives and so on, a dry paper strength reinforcing agent chosen from among anionic, cationic or amphoteric polyalcrylamides, polyvinyl alcohol, cationized starch (as disclosed, e. g., in JP-A-03-171042), vegetable galactomannan and so on, a wet paper strength reinforcing agent chosen from among polyaminepolyamide epichlorohydrin resins and so on, a filler chosen from among clay, kaolin, calcium carbonate, titanium oxide and so on, a fixing agent chosen from among water-soluble aluminum salts, including aluminum chloride and aluminum sulfate, and so on, a pH modifier chosen from among sodium hydroxide, sodium carbonate, sulfuric acid and so on, and/or a coloring pigment, a coloring dye, a brightening agent and like agents as disclosed, e.g., in JP-A-63-204251 and JP-A-01-266537.

Further, other additives including various water-soluble polymers, antistatic agents and so on can be applied to raw paper with a spray or a tub size press.

Water-soluble polymers suitable for the application include the starch type polymers disclosed in JP-A-01-266537, polyvinyl alcohols, gelatins, polyacrylamides and celluloses; and antistatic agents suitable therefor are conductive substances such as nonionic surfactants represented by polyoxyethylene glycols, anionic surfactants, cationic surfactants represented by quaternary ammonium salts, amphoteric surfactants, alkylamine derivatives, fatty acid derivatives, various kinds of waxes, carbon black, graphite, metal surface covering pigments, metal powders, metal flakes, carbon fibers, metallic fibers, whiskers (including potassium titanate, alumina nitride and alumina), and so on. Specific compounds as the antistatic agent include alkali metal salts such as sodium chloride, potassium chloride, etc., alkaline earth metal salts such as calcium chloride, barium chloride, etc., colloidal metal oxides such as colloidal silica, etc., organic antistatic agents such as polystyrenesulfonic acid salts, etc., and so on.

Also, it is desirable to apply a proper combination of latexes or emulsions, such as petroleum resin emulsions, styrene-acrylic acid-acrylate copolymer latexes, styrene-acrylic acid-butadiene copolymer latexes, styrene-vinyl acetate copolymer latexes, styrene-maleic acid-acrylate copolymer latexes, etc., pigments such as clay, kaolin, talc, barium sulfate, titanium dioxide, etc., pH modifiers such as hydrochloric acid, phosphoric acid, citric acid, sodium hydroxide, etc., and/or coloring pigments, coloring dyes, brightening agents and other additives as described above.

An example of raw paper preferred in particular is the raw paper disclosed in JP-A-04-97365, which is prepared by making paper from paper stock containing an epoxidized fatty acid amide and adjusted to pH 5.5–6.5, controlling the water content in the paper to 1–4% by weight, and then performing a surface size treatment with an alkaline aqueous solution to adjust the pH of paper surface to the range of 7 to 8.

Moreover, it is desirable that the raw paper used in the present invention have a smooth surface such that the Bekk smoothness thereof is at least 100 seconds, particularly at least 200 seconds, based on the definition of JIS P8119.

In order to prepare raw paper having a Bekk smoothness of at least 100 seconds, wood pulp containing hardwood pulp in a large proportion is generally used. This is because hardwood pulp is made up of short fibers which are advantageous to the formation of a smooth surface. Further, the wood pulp is beaten with a beater so that the proportion of long fibers therein may become as small as possible.

More specifically, it is desirable to perform the beating operation so that the fiber lengths of the beaten pulp may correspond to a 42-mesh residue of 20 to 40% and a water leakiness of 20 to 350 CSF.

Then, the paper stock slurry, to which internal chemicals are added in advance, is made into paper. The paper-making is carried out so as to obtain uniform formation using a commonly used paper machine such as Fourdrinier paper machine, a cylinder paper machine or so on in accordance with an appropriate paper-making method as disclosed, e.g., in JP-A-58-37642, JP-A-61-260240 and JP-A-61-284762. The thus made paper is processed with a machine calender, a super calender, a heat calender or the like. As a result of it, raw paper having a Bekk smoothness of at least 100 seconds can be prepared. The raw paper used in the present invention does not have any particular limitation on thickness, but it is desirable for the raw paper to have a basis weight of from 40 to 250 $g/m^2$.

Suitable examples of polyolefin resins covering the both surfaces of raw paper include olefin homopolymers such as a low density polyethylene, a medium density polyethylene, a high density polyethylene, polypropylene, polybutene, polypentene, etc., copolymers of olefins such as an ethylene-propylene copolymer, and mixtures of two or more thereof. Of these polyolefins, low density polyethylene resins, especially ethylene-$\alpha$-olefin copolymer resins having a density of from 0.870 to 0.915 $g/cm^3$, are preferred over others.

When a resin coat covering the raw paper is constructed of two or more layers, the layers may differ from one another in property and constituent resins. For instance, it is possible to use a resin having MFR of from 5 to 20 g/10 min for the top layer of the resin coat and a resin having MFR of from 2 to 10 g/10 min for the bottom layer of the resin coat.

In providing the backing layer of the present invention, a water-base composition is applied to the polyolefin resin coat. However, various alcohols, such as methanol, ethanol, etc., may be added to the composition, if needed.

The backing layer may be provided using any of well-known coating methods, including a dip coating method, an air-knife coating method, a curtain coating method, a roller coating method and so on.

The backing layer is not particularly restricted as to its thickness. However, the thickness ranging from 0.1 to 3 $\mu m$ suffices to perform functions of the backing layer. In providing the backing layer, it is desirable that the surface of the polyolefin layer to be covered therewith undergo in advance an etching treatment with an acid, a flame treatment with a gas burner, a corona discharge treatment, a glow discharge treatment or the like.

In accordance with embodiments of the present invention, the aqueous dispersion of a polyolefin resin having a melting point of 100° C. at the highest is incorporated in the backing layer formed on the back side of a waterproof substrate having polyolefin resin coats on both sides. This aqueous dispersion incorporated in the backing layer of the present support for photographic printing paper not only enables an improvement in ink printability of the backing layer but also can enhance the spliceabilty of photographic printing paper in a splicing operation utilizing thermal fusion with ultrasonic waves or so on. Therefore, even when ink is printed on the back side of the photographic printing paper according to the present invention, there occurs no transfer of the ink onto the silver halide photographic emulsion layer thereof. In addition, satisfactory splicing can be achieved between polyolefin resin coats when the photographic printing paper according to the present invention undergoes a splice operation.

The present invention will now be illustrated in more detail by reference to the following examples. However, the invention should not be construed as being limited to these examples.

EXAMPLE 1 AND COMPARATIVE EXAMPLES 1 AND 2

Raw paper was covered with a 15 μm-thick resin coat on the front side by applying thereto the composition prepared by throughly mixing:

(i) 30 parts by weight of titanium oxide master batch pellets constituted of 48% by weight of an ethylene-butene-1 copolymer resin having an MFR of 2.5 g/10 min and a density of 0.908 g/cm$^3$, 2.0% by weight of zinc stearate and 50% by weight of $TiO_2$ mixed with 0.7% by weight (on a coverage basis) of $Ai_2O_3$ and 1% by weight (on a coverage basis) of methylol ethane and having an average grain size of 0.20 μm (determined by measuring major and minor axes of grains with an electron microscope and taking an average thereof), (ii) 4 parts by weight of ultramarine master batch pellets constituted of 2.3% by weight of ultramarine blue, 5.7% by weight of ultramarine violet, 5.7% by weight of low molecular-weight polyethylene and 86.3% by weight of a low density polyethylene resin (abbreviated as "LDPE resin") having an MFR of 3 g/10 min and a density of 0.927 g/cm$^3$, and (iii) 66 parts by weight of ethylene-butene-1 copolymer resin pellets having an MFR of 2.5 g/10 min and a density of 0.908 g/cm$^3$. Thus, the resin coat had a titanium oxide content of 15% by weight and an ultramaline (including blue and violet ones) content of 0.32% by weight.

On the back side of the raw paper, a 20 μm-thick layer constituted of 70 parts by weight of a high density polyethylene (abbreviated as "HDPE resin") having an MFR of 8 g/10 min and a density of 0.96 g/cm$^3$ and 30 parts by weight of a LDPE resin having an MFR of 8 g/10 min and a density of 0.918 g/cm$^3$, and a 10 μm-thick layer constituted only of a LDPE resin having an MFR of 8 g/10 min and a density of 0.918 g/cm$^3$ were formed by a melt extrusion method using a black box-type two-layer simultaneous co-extrusion die. Herein, the former layer was disposed nearer to the raw paper than the latter layer.

The back surface of the thus obtained substrate was subjected to a corona discharge treatment, and then provided with a backing layer having a thickness of 0.5 μm by coating thereon each of the aqueous coating compositions shown in Table 1 with a gravure coater, followed by drying. Thus, three samples for photographic printing paper support were obtained.

Further, the resin coat as the front surface of each support sample was subjected to a corona discharge treatment at 15 KV. A, and then was coated thereon 10 mg/m$^2$ of gelatin by means of a gravure coater, followed by drying.

On the surface of the thus formed gelatin coat was coated an emulsion for color photographic printing paper in accordance with a slide bead coating method to prepare a sample of color photographic printing paper.

Each of the thus obtained samples of color photographic printing paper was examined for ink receptivity, anti-staining property, ultrasonic spliceability, thermal fusion spliceability and antistatic property in accordance with the following methods respectively. The results obtained are shown in Table 2. Therein, evaluation was made in three grades symbolized by the mark ○ for good properties, the mark Δ for slightly good properties and the mark × for bad properties.

Evaluation Methods (1) Ink Receptivity:

Letters are typewritten on the backing layer of a sample with an impact printer installed in an automatic printer. Then, the resulting sample is processed with a roller transport processor, and observed the appearance of the typewritten letters, thereby judging whether or not the typewritten letters are retained in a good condition.

(2) Anti-Staining Property:

A sample of photographic printing paper is processed with a roller transport processor wherein a color-developing step (30° C.; 3 min. 30 sec.), a bleaching step (30° C.; 1 min. 30 sec.), a washing step (30° C.; 3 min.) and a drying step (80° C.; 20 sec.) are involved and blackish brown stain having generated in the color developer by ageing has adhered to the rollers set therein. The processed sample is examined as to whether or not the blackish brown stain is transferred onto the back side of the sample when the surfaces of the sample are pressed against the stained surfaces of the rollers. The extent of transferred stain is judged by visual observation.

(3) Ultrasonic Spliceability:

Prior to color development, two sheets of 8.9 cm-wide sample of photographic printing paper are overlapped with each other at the top edge part thereof so as to have an overlap of 5 mm in width, and an 5 mm-wide ultrasonic oscillator generating the ultrasonic wave having a frequency of 28 KHz and an amplitude of 30 μm is pressed against the overlapped part for 30 seconds as a pressure of 20 Kg/cm$^2$ is applied thereto, thereby splicing the two sheets. The thus spliced sample is processed with a roller transport processor, and then observed to what extent the spliced part is delaminated, thereby judging the spliceability of the sample.

(4) Thermal fusion Spliceability:

Prior to color development, two sheets of 8.9 cm-wide sample of photographic printing paper are overlapped with each other at the top edge part thereof so as to have an overlap of 5 mm in width, and the overlapped part is heated at 130° C. for 20 seconds with an 5 mm-wide aluminum heater as the heater is pressed against the overlapped part under a pressure of 20 Kg/cm$^2$, thereby splicing the two sheets. The thus spliced sample is processed with a roller transport processor, and then observed to what extent the spliced part is delaminated, thereby judging the spliceability of the sample.

(5) Antistatic Property:

Prior to color development, the backing layer of a sample is examined for intrinsic surface resistance in the atmosphere of 20° C. and 35% RH, thereby judging the anti-static property thereof.

Further, the backing layer of Comparative Example 2 was found to be inferior to that of Example 1 in (1) ink receptivity and (4) thermal fusion spliceability. This result indicates that bad ink receptivity and unsatisfactory thermal fusion spliceability are due to the use of gelatin instead of the aqueous dispersion of a styrene-acrylate copolymer as well as the exclusion of a polyolefin resin.

TABLE 1

| Formula | Example 1 | | Comparative Example 1 | | Comparative Example 2 | |
|---|---|---|---|---|---|---|
| A: Binder | Aqueous dispersion of styrene-acrylate copolymer | 17 parts | Aqueous dispersion of styrene-acrylate copolymer | 17 parts | Gelatin | 3 parts |
| | Aqueous dispersion of ethylene-acrylate copolymer | 8 parts | | | | |
| B: Antistatic agent | Sodium polystyrenesulfonate | 6 parts | Sodium polystyrenesulfonate | 6 parts | Sodium polystyrene-sulfonate | 6 parts |
| C: Matting agent | Colloidal silica | 20 parts | Colloidal silica | 20 parts | Colloidal silica | 20 parts |
| D: Water | | 49 parts | | 57 parts | | 71 parts |

Colloidal silica: Snowtex C, trade name, products of Nissan Chemical Industries Ltd.
Sodium Polystyrenesulfonate: Chemistat 6120, trade name, products of Sanyo Kaser Co., Ltd.

TABLE 2

| Properties | Example 1 | Comparative Example 1 | Comparative Example 2 |
|---|---|---|---|
| | Evaluation Results | | |
| (1) Ink Receptivity | ○ | ○ | x |
| (2) Anti-stain Property | ○ | ○ | ○ |
| (3) Ultrasonic Spliceability | ○ | Δ | ○ |
| (4) Thermal Fusion Spliceability | ○ | x~Δ | Δ |
| (5) Antistatic Property | ○ | ○ | ○ |

As can be seen from Table 2, the backing layer of the present photographic printing paper support (Example 1) was good in all the properties, namely (1) ink receptivity, (2) anti-staining property, (3) ultrasonic spliceability, (4) thermal fusion spliceability and (5) antistatic property.

On the other hand, the backing layer of Comparative Example 1 was found to be inferior in (3) ultrasonic spliceability and (4) thermal fusion spliceability. This result indicates that the addition of the aqueous dispersion of a polyolefin resin can produce improvements of (3) ultrasonic spliceability and (4) thermal fusion spliceability.

EXAMPLES 2 TO 15

Other samples of the present photographic printing paper support were prepared in the same mariner as in Example 1, except that the ingredients used in the coating solution for the backing layer were changed to those shown in Table 3. Their properties were also evaluated in accordance with the same methods as employed in Example 1. The evaluation results are shown in Table 5. Therein, good properties are symbolized by the mark ○, properties on the minimum level of practical use by the mark Δ, and properties unsuitable for practical use by the mark ×.

TABLE 3

| | Ingredients for Backing Layer (amount used: by weight) | | | |
|---|---|---|---|---|
| | (a) Colloidal Silica 20 pts. | (b) Styrene-Acrylate Copolymer 20 pts. | Water-Soluble Polymer 6 pts. | (c) Carboxyl or Sulfo Group contg. Compound 6 pts. |
| Example 2 | Colloidal silica | Styrene-2-ethylhexyl acrylate copolymer | Styrene-maleic acid copolymer | Sodium polystyrenesulfonate |
| Example 3 | Colloidal silica | Styrene-2-ethylhexyl acrylate copolymer | Styrene-maleic acid copolymer | " |
| Example 4 | Colloidal silica | Styrene-2-ethylhexyl acrylate copolymer | PVA | " |
| Example 5 | Colloidal silica | Styrene-2-ethylhexyl acrylate copolymer | Carboxyl modified PVA | " |
| Example 6 | Colloidal silica | Styrene-2-ethylhexyl acrylate copolymer | Styrene-maleic acid copolymer | Sodium polyacrylate |
| Example 7 | Colloidal silica | Styrene-2-ethylhexyl acrylate copolymer | Styrene-maleic acid copolymer | Sodium salt of carboxyl modified polyethylene |
| Example 8 | Colloidal silica | Styrene-2-ethylhexyl acrylate copolymer | Styrene-maleic acid copolymer | Sodium polystyrenesulfonate |
| Example 9 | Colloidal silica | Styrene-2-ethylhexyl acrylate copolymer | Styrene-maleic acid copolymer | " |
| Example 10 | Colloidal silica | Styrene-butylacrylate copolymer | Styrene-maleic acid copolymer | " |
| Example 11 | Colloidal silica | Styrene-butylacrylate copolymer | Styrene-maleic acid copolymer | " |

TABLE 3-continued

| Ingredients for Backing Layer (amount used: by weight) | | | | |
|---|---|---|---|---|
| Example 12 | Colloidal silica | Styrene-butylacrylate copolymer | PVA | " |
| Example 13 | Colloidal silica | Styrene-butylacrylate copolymer | Carboxyl modified PVA | " |
| Example 14 | Colloidal silica | Styrene-butylacrylate copolymer | Styrene-maleic acid copolymer | " |
| Example 15 | Colloidal silica | Styrene-butylacrylate copolymer | Styrene-maleic acid copolymer | " |

| | (d) Polyolefin 10 pts. | m. pt. (°C.) | Hardener 0.5 pt. |
|---|---|---|---|
| Example 2 | Ethylene-acrylic acid copolymer | 90 | — |
| Example 3 | Ethylene-acrylic acid copolymer | 70 | — |
| Example 4 | Ethylene-acrylic acid copolymer | 90 | — |
| Example 5 | Ethylene-acrylic acid copolymer | 90 | — |
| Example 6 | Ethylene-acrylic acid copolymer | 90 | — |
| Example 7 | Ethylene-acrylic acid copolymer | 90 | — |
| Example 8 | Ethylene-acrylic acid copolymer | 90 | Water-soluble epoxy cpd. |
| Example 9 | Urethane modified polyethylene | 80 | — |
| Example 10 | Ethylene-acrylic acid copolymer | 90 | — |
| Example 11 | Ethylene-acrylic acid copolymer | 70 | — |
| Example 12 | Ethylene-acrylic acid copolymer | 90 | — |
| Example 13 | Ethylene-acrylic acid copolymer | 90 | — |
| Example 14 | Ethylene-acrylic acid copolymer | 90 | Water-soluble epoxy cpd. |
| Example 15 | Urethane modified polyethylene | 80 | — |

Na salt of carboxyl modified polyethylene: Zaiksen N, trade name, products of Setetsu Kagaku Co., Ltd.
Water-soluble epoxy cpd.: NER-010, trade name, products of Nagase Sangyo Co., Ltd.

COMPARATIVE EXAMPLES 3 TO 12

Other comparative samples of photographic printing paper support were prepared in the same manner as in Example 1, except that the ingredients used in the coating solution for the backing layer were changed to those shown in Table 4. Their properties were also evaluated in accordance with the same methods as employed in Example 1. The evaluation results are shown in Table 5. Therein, good properties are symbolized by the mark ○, properties on the minimum level of practical use by the mark Δ, and properties unsuitable for practical use by the mark ×.

TABLE 4

| Ingredients for Backing Layer (amount used: by weight) | | | | |
|---|---|---|---|---|
| | (a) Colloidal Silica 20 pts. | (b) Styrene-Acrylate Copolymer 20 pts. | Water-Soluble Polymer 6 pts. | (c) Carboxyl or Sulfo Group contg. Compound 6 pts. |
| Compar. Example 3 | — | Styrene-2-ethylhexyl acrylate copolymer | Styrene-maleic acid copolymer | Sodium polystyrenesulfonate |
| Compar. Example 4 | Colloidal silica | — | Styrene-maleic acid copolymer | " |
| Compar. Example 5 | Colloidal silica | Styrene-2-ethylhexyl acrylate copolymer | Styrene-maleic acid copolymer | " |
| Compar. Example 6 | Colloidal silica | Styrene-2-ethylhexyl acrylate copolymer | Styrene-maleic acid copolymer | " |
| Compar. Example 7 | Colloidal silica | Styrene-2-ethylhexyl acrylate copolymer | Styrene-maleic acid copolymer | Sodium polyacrylate |
| Compar. Example 8 | Colloidal silica | Styrene-2-ethylhexyl acrylate copolymer | Styrene-maleic acid copolymer | " |
| Compar. Example 9 | Colloidal silica | Styrene-2-ethylhexyl acrylate copolymer | Styrene-maleic acid copolymer | " |
| Compar. Example 10 | Colloidal silica | Styrene-2-ethylhexyl acrylate copolymer | Styrene-maleic acid copolymer | " |
| Compar. Example 11 | Colloidal silica | Styrene-2-ethylhexyl acrylate copolymer | Styrene-maleic acid copolymer | " |
| Compar. Example 12 | Colloidal silica | Styrene-2-ethylhexyl acrylate copolymer | Styrene-maleic acid copolymer | " |

| | (d) Polyolefin 10 pts. | m. pt. (°C.) | hardener, 0.5 pt. |
|---|---|---|---|
| Compar. | Ethylene-acrylic | 90 | — |

TABLE 4-continued

Ingredients for Backing Layer (amount used: by weight)

| | | | |
|---|---|---|---|
| Example 3 | acid copolymer | | |
| Compar. Example 4 | Ethylene-acrylic acid copolymer | 90 | — |
| Compar. Example 5 | Ethylene-acrylic acid copolymer | 90 | — |
| Compar. Example 6 | Ethylene-acrylic acid copolymer | 90 | — |
| Compar. Example 7 | Ethylene-acrylic acid copolymer | — | — |
| Compar. Example 8 | — | — | Water-soluble epoxy cpd. |
| Compar. Example 9 | Ethylene-acrylic acid copolymer | 110 | — |
| Compar. Example 10 | Medium-crystalled polyethylene resin | 110 | — |
| Compar. Example 11 | High-crystalled polyethylene resin | 140 | — |
| Compar. Example 12 | Polypropylene | 150 | — |

TABLE 5

| | Ink Receptivity | Anti-Staining Property | Ultrasonic Spliceability | Thermal Fusion Spliceability |
|---|---|---|---|---|
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Example 6 | ○ | ○ | ○ | ○ |
| Example 7 | ○ | ○ | ○ | ○ |
| Example 8 | ○ | ○ | ○ | ○ |
| Example 9 | ○ | ○ | ○ | ○ |
| Example 10 | ○ | ○ | ○ | ○ |
| Example 11 | ○ | ○ | ○ | ○ |
| Example 12 | ○ | ○ | ○ | ○ |
| Example 13 | ○ | ○ | ○ | ○ |
| Example 14 | ○ | ○ | ○ | ○ |
| Example 15 | ○ | ○ | ○ | ○ |
| Comparative Example 3 | ○ | x | ○ | ○ |
| Comparative Example 4 | x | ○ | ○ | ○ |
| Comparative Example 5 | ○ | x | ○ | ○ |
| Comparative Example 6 | ○ | Δ | ○ | ○ |
| Comparative Example 7 | ○ | ○ | Δ | x |
| Comparative Example 8 | ○ | ○ | Δ | x |
| Comparative Example 9 | Δ | ○ | Δ | x |
| Comparative Example 10 | Δ | ○ | Δ | x |
| Comparative Example 11 | x | ○ | Δ | x |
| Comparative Example 12 | x | ○ | Δ | x |

The evaluation results shown in Table 5 have proved that the improvement in anti-staining property can be produced by colloidal silica, the improvement in ink receptivity by styrene-acrylate copolymers, the improvement in anti-staining property by water-soluble high-molecular compounds, and the improvements in ultrasonic spliceability and thermal fusion spliceability by aqueous dispersions of polyolefin resins, provided that their melting points are below 100° C.

What is claimed is:

1. A photographic printing paper support comprising a waterproof substrate constituted of raw paper and polyolefin resin coats covering the both surfaces thereof, said support further having on the back side of the substrate a backing layer containing at least (a) colloidal silica, (b) an aqueous dispersion of a styrene-acrylate copolymer prepared by the polymerization in the presence of a water-soluble high-molecular compound, (c) at least one substance selected from a group consisting of carboxyl or sulfo group-containing water-soluble high-molecular compounds, the metal salts thereof and hydrophilic organic high-molecular colloidal substances and (d) an aqueous dispersion of a polyolefin resin having a melting point below 100° C.

2. The photographic printing paper support of claim 1, said backing layer further containing as a hardener a compound having at least two ethyleneimino or glycidyl ether groups per molecule.

3. The photographic printing paper support of claim 1, wherein the coverage of colloidal silica as the component (a) is in the range of 0.04 to 1.0 g/$m^2$ on a solids basis.

4. The photographic printing paper support of claim 1, wherein the coverage of the aqueous dispersion as the component (b) is in the range of 0.05 to 2.0 g/m$^2$ on a solids basis.

5. The photographic printing paper support of claim 1, wherein the coverage of the substance as the component (c) is in the range of 0.01 to 1.0 g/m$^2$ on a solids basis.

6. The photographic printing paper support of claim 1, wherein the coverage of the aqueous dispersion as the component (d) is in the range of 0.01 to 1.0 g/m$^2$ on a solids basis.

7. The photographic printing paper support of claim 1, wherein the components (a), (b), (c) and (d) are contained at the ratio of (a)/(b)/(c)/(d)=(2–10)/(4–15)/-(1–3)/(1–3) by weight.

8. The photographic printing paper support of claim 1, wherein the ratio of styrene to acrylate in the styrene-acrylate copolymer ranges from 90/10 to 10/90 by mole.

9. The photographic printing paper support of claim 1, wherein the acrylate in the styrene-acrylate copolymer is an ester of acrylic acid and an aliphatic alcohol containing 1 to 8 carbon atoms.

10. The photographic printing paper support of claim 1, wherein the water-soluble high-molecular compound present in the polymerization is a styrene-maleic acid copolymer.

11. The photographic printing paper support of claim 1, wherein the copolymer has a molecular weight of from 2,000 to 150,000.

12. The photographic printing paper support of claim 11, wherein the carboxyl group-containing water-soluble high-molecular compound is a copolymer of maleic anhydride and an unsaturated copolymerizable monomer containing at least 4 carbon atoms.

13. The photographic printing paper support of claim 1, wherein the high-molecular compound has a molecular weight of 5,000 to 1,000,000.

14. The photographic printing paper support of claim 13, wherein the sulfo group-containing water-soluble high-molecular compound is polystyrenesulfonic acid, polyvinylbenzylsulfonic acid or the sodium or potassium salt thereof.

15. The photographic printing paper support of claim 1, wherein the hydrophilic organic high-molecular colloidal substance is an aqueous solution or dispersion of a carboxyl-modified polyethylene or the alkali metal, ammonium or amine salt thereof.

16. The photographic printing paper support of claim 1, wherein the polyolefin resin having a melting point below 100° C. is selected from among an ethylene-acrylic acid copolymer resin, an ethylene-maleic acid copolymer resin, an ethylene-acrylate copolymer resin and polyolefin resins modified by hydroxyl, carboxyl, amino, amido, epoxy, alkoxysilane, urethane or isocyanate groups.

17. The photographic printing paper support of claim 16, wherein the polyolefin resin is an ethylene-acrylic acid copolymer resin.

18. The photographic printing paper support of claim 1, wherein the polyolefin resin having a melting point of below 100° C. has a particle size of from 0.01 to 0.5 μm in the aqueous dispersion thereof.

19. The photographic printing paper support of claim 1, the backing layer having a thickness of 0.1 to 3 μm.

* * * * *